UNITED STATES PATENT OFFICE.

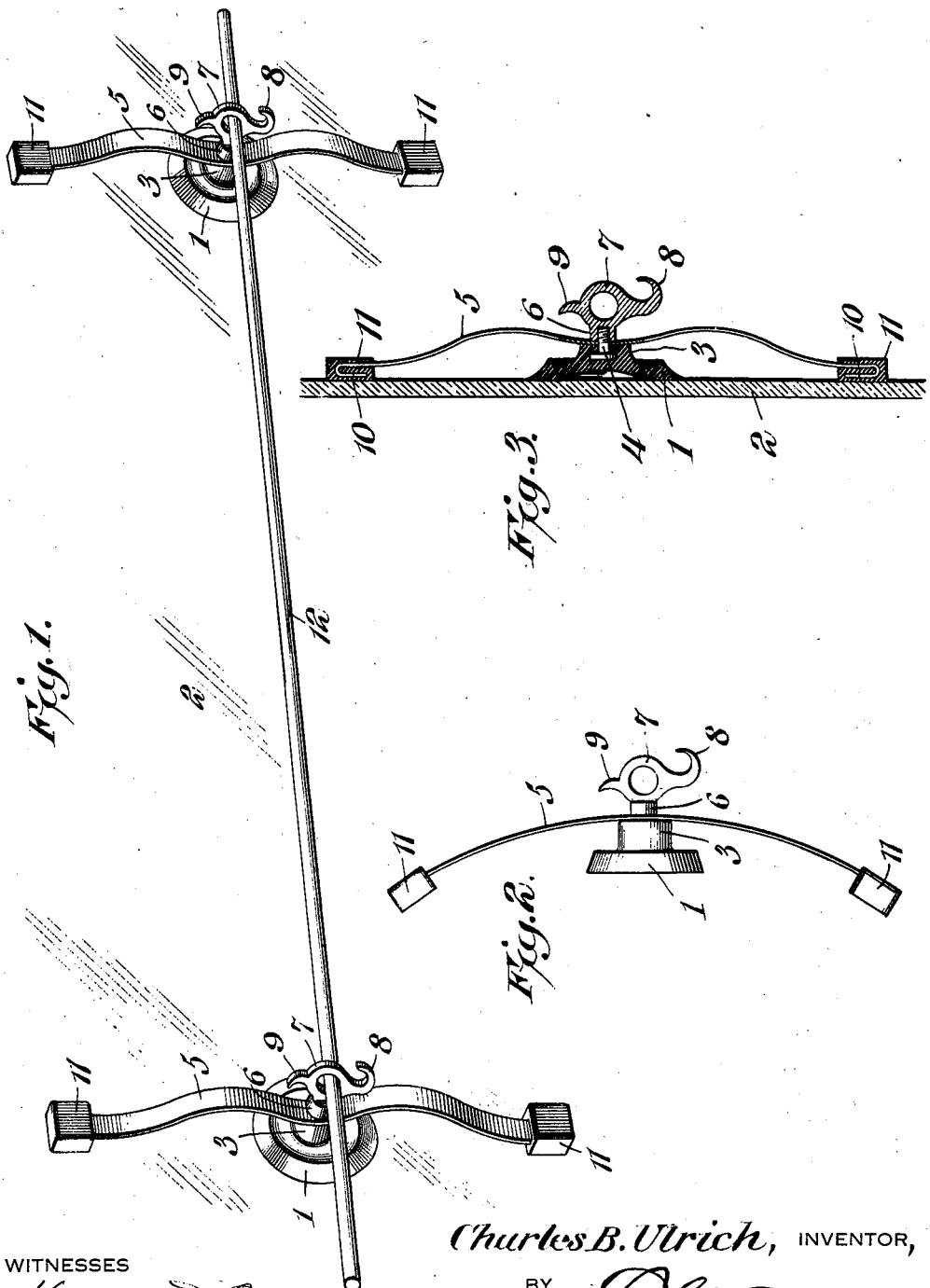

CHARLES B. ULRICH, OF HANCOCK, MICHIGAN.

VACUUM-CLIP.

1,000,858.  Specification of Letters Patent.  Patented Aug. 15, 1911.

Application filed February 11, 1911. Serial No. 608,060.

*To all whom it may concern:*

Be it known that I, CHARLES B. ULRICH, a citizen of the United States, residing at Hancock, in the county of Houghton and State of Michigan, have invented a new and useful Vacuum-Clip, of which the following is a specification.

This invention has reference to improvements in vacuum clips wherein atmospheric pressure is employed for retaining the clip in engagement with a smooth surface, such as the surface of a sheet of glass, and the object of the invention is to provide a means whereby the clip will not only be held against accidental displacement in a direction tending to break the vacuum, but which may be utilized as a holding means for various articles.

The invention will be best understood from a consideration of the following detailed description, taken in connection with the accompanying drawings forming a part of this specification, with the understanding, however, that while the drawings show a practical form of the invention, the latter is not limited to the exact disclosure of the drawings, since it is susceptible of other practical embodiments without departure from the salient features of the invention.

In the drawings:—Figure 1 is a perspective view showing the improved clip when used as a terminal support for a curtain or other rod. Fig. 2 is an edge or side view of the clip when unattached. Fig. 3 is a longitudinal section with some parts in elevation, showing the clip applied to a smooth surface, such as a sheet of glass.

Referring to the drawings, there is shown a cup 1 which may be made of elastic material, such as rubber, and may conform in shape to the vacuum cups usually employed in vacuum clips, the margins of the cup inclosing a chamber from which, when the cup is collapsed against a smooth surface, such as a glass sheet 2 shown in Fig. 3, air will be expelled from the interior of the cup, and since the margins of the cup closely adhere to the glass surface no air can enter the chamber, and consequently the atmospheric pressure exerted against the outer surface of the cup maintains it in place with a force commensurate with the area of the cup. The cup is provided with a central boss or enlargement 3 in which is embedded the headed end of a screw 4, the other end of which is threaded and projects beyond the outer end of the boss 3. This screw is in traversing relation to a leaf spring 5 which may normally assume a bowed form, as illustrated in Fig. 2, the concavity of the bow being toward the cup 1, and this spring is held to the cup by a nut 6 applied to the screw 4 and bearing against the corresponding face of the spring 5. The nut has formed thereon an eye 7 and at one side of this eye a hook 8, while on the other side of the eye there is formed a spur 9, and the eye end of the nut may be flattened as indicated, so that its faces are parallel, while the hook 8 and spur 9 are in line one with the other in approximately perpendicular relation to the axis of the nut. The free ends of the spring 5 which may extend equally on opposite sides of the cup 1, are inturned to form open loops 10 and about these open loops there are applied elastic blocks 11 which may be made of rubber and molded on the ends of the spring 5.

It will be observed that in the unapplied condition of the clip, as shown in Fig. 2, a line extending between the elastic blocks 11 will be considerably to one side of the active edge of the cup 1, so that when the attempt is made to apply the cup 1 to a smooth surface, such as the glass plate 2, the blocks 11 will engage such plate first and the spring 5 will be bent back on both sides of the cup 1, so that the spring 5 is put under considerable tension when the cup 1 is finally forced into intimate engagement with the plate 2, and since the blocks 11 are preferably flat on the faces designed to engage the plate 2 they will lie snugly against such plate, so that any articles, such as a sheet of paper or like material, will be firmly gripped against the face of the plate 2 and held from accidental removal by the force of the corresponding end of the spring 5 and the frictional engagement with such sheet of the rubber block 11. The clip may, therefore, be employed for the holding of any laminiform material or article, or any articles which may be introduced under either or both the blocks 11 to be clamped thereby against the surface carrying the cup 1. Furthermore, the spaced blocks 11 held elastically against the surface to which the cup 1 is attached act through the spring 5 to maintain the position of the cup with relation to the surface to which it is attached, thus preventing the breaking of the vacuum which causes the adherence of the cup to its support, the spring 5 preventing rocking and the frictional engagement of the blocks 11 preventing sliding movement of the cup with relation to the supporting surface. Moreover, the eyes 7 may be employed for the reception of the corresponding end of a rod 12, so that by using two of the clips in spaced relation they may be employed for the support of a curtain rod, whereby the curtain may be readily placed in obscuring relation to a window, instead of it being necessary to attach the rod to the window sash or window frame, and, also, the clips provide means whereby a curtain rod of comparatively limited length may be attached to a large window so as to hide an interior in part from view, instead of it being necessary to mount a long curtain rod for the same purpose. The spring 5 and blocks 11 are especially useful in connection with the vacuum cup when the clips are employed in the manner just described and as illustrated in Fig. 1 for the holding of a curtain or other rod. The hooks 8 may be used for suspension purposes and the spring 5 and blocks 11 in this case contribute toward maintaining firm adherence between the cup 1 and the support to which it is attached. The clip is also useful for holding sheets of drawing or tracing material on light transmitting supports, such as glass plates, where it is desirable that light should be transmitted through the drawing or tracing sheet to the eye of the worker, the cup 1 readily adhering to a glass plate, while one or other of the blocks 11 will firmly hold the adjacent edge or corner of the sheet to a glass plate.

One or more of the clips may be employed in show windows for holding articles for display, and the rod 12 may be used for the support of numerous articles to be displayed and requires but two clips for the purpose. Again, the hooks 8 may be placed in line one with the other for the attachment of guy wires, and even the spurs 9 may be used for like purposes. In fact, the device is susceptible of a great variety of uses, which will be apparent from the examples given.

What is claimed is:—

1. A vacuum clip comprising a suction cup having a threaded stem projecting from the face thereof remote from the suction side, an elastic strip traversed intermediately by the threaded stem and at the ends carrying friction blocks, and a nut for the threaded stem for holding the elastic strip to the vacuum cup, said nut being provided with integral article supporting means.

2. A vacuum clip comprising a suction cup, a spring strip secured intermediately to said cup and having a normal tendency at the ends toward the suction side of the cup, and blocks of friction material secured to the free ends of the strip with active portions on the same side of the strip as the vacuum cup.

3. A vacuum clip comprising a suction cup, a spring strip secured intermediately to said cup and having a normal tendency at the ends toward the suction side of the cup, and blocks of friction material secured to the free ends of the strip with active portions on the same side of the strip as the vacuum cup, the free ends of the strip being returned on themselves and embedded in the friction material.

4. A vacuum clip comprising a suction cup, a threaded stem carried by the cup and projecting from the face thereof remote from the suction side, an elastic strip traversed intermediately by the threaded stem and at the ends carrying friction blocks having the active portions on the same side of the strip as the vacuum cup, and a nut for the stem for clamping the elastic strip to the cup, said nut being provided with an integral manipulating portion formed with means for the attachment of an article to be upheld by the clip.

In testimony, that I claim the foregoing as my own, I have hereto affixed my signature in the presence of two witnesses.

CHARLES B. ULRICH.

Witnesses:
 PEARL KENDALL,
 DANIEL FISHER.